United States Patent [19]

Larson

[11] Patent Number: 4,978,027

[45] Date of Patent: Dec. 18, 1990

[54] FUEL TANK WITH VENT SYSTEM

[75] Inventor: Robert M. Larson, Mequon, Wis.

[73] Assignee: The Kelch Corporation, Cedarburg, Wis.

[21] Appl. No.: 500,082

[22] Filed: Mar. 28, 1990

[51] Int. Cl.5 ............................................. B61C 17/02
[52] U.S. Cl. ..................................... 220/366; 220/373; 220/DIG. 21; 220/DIG. 27
[58] Field of Search ....... 220/227, DIG. 27, DIG. 21, 220/85 VR, 85 VS, 369, 373, 366

[56] References Cited

U.S. PATENT DOCUMENTS

| | | | |
|---|---|---|---|
| 1,888,813 | 11/1932 | Winslow | 220/373 |
| 2,094,329 | 9/1937 | Mascuch | 220/373 |
| 3,391,818 | 7/1968 | Hairston | 220/373 |
| 4,142,470 | 3/1979 | Zauss | 220/373 |
| 4,664,287 | 5/1987 | Wilson et al. | 220/DIG. 27 |
| 4,706,840 | 11/1987 | Thompson | 220/373 |

Primary Examiner—Joseph Man-fu Moy
Attorney, Agent, or Firm—Quarles & Brady

[57] ABSTRACT

A fuel tank having a venting system is disclosed. It uses a vent pipe extending upwardly above the maximum quiescent fuel level. An open end of the vent pipe is surrounded by a baffle wall that is closed the top and open at the bottom. The other end of the vent pipe passes through a lower wall of the tank and is attached to a drain hose. A further partition wall may also be used on the tank.

6 Claims, 2 Drawing Sheets

FIG. 3
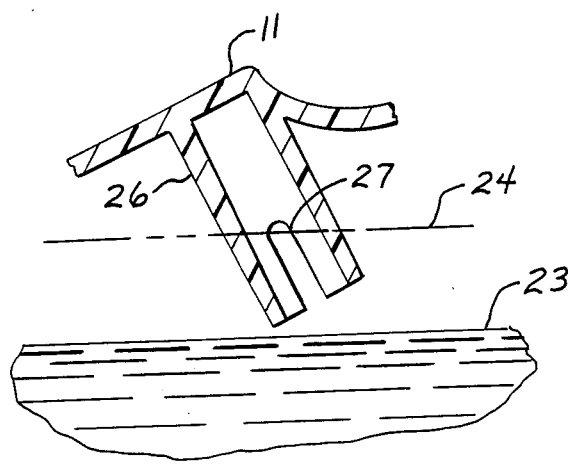
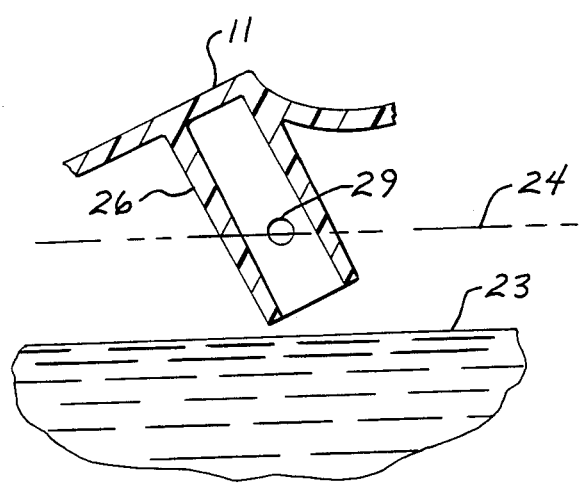
FIG. 4

FUEL TANK WITH VENT SYSTEM

BACKGROUND OF THE INVENTION

1. Field of the Invention

The invention relates to fuel tanks such as those used with small engines in garden tractors and the like. More particularly, it relates to a venting system used therewith.

2. Background of the Art

Fuel tanks are typically vented to maintain their internal pressure at acceptable levels. Without venting, temperature change, fuel agitation and/or consumption of fuel by the engine, may generate substantial positive or negative pressure within the tank. Such pressure may interfere with the proper delivery of fuel from the fuel tank to the carburetor of the engine during the engine's operation.

The required venting is usually accomplished by means of a venting orifice at the top of the tank. The orifice may be incorporated into the cap used to close the filling port. Alternatively the orifice may be a separate hole in a gauge or the like or simply a slot cut through the cap threads and gasket.

The agitation of the fuel during the operation of the engine, and variations in the attitude of the engine platform which may be a small tractor or the like, makes it desirable that the venting orifice be fitted with a means of limiting the escape of liquid fuel thrown against the vent. The orifice, therefore, is often fitted with a convoluted channel or filter to try to selectively pass vapor but not liquid. Such methods of preventing the escape of liquid fuel are not wholly successful and it is not unusual for small quantities of liquid fuel to escape through or around the fuel cap during operation of the engine. This is especially true when the fuel tank is full. Bidirectional check valves have been tried, but often these can require maintenance and/or exacting manufacturing tolerances.

In any event, even where prior art systems prevent liquid fuel leakage, because the vent is near the top of the tank the user of the engine may be exposed to unpleasant fumes.

SUMMARY OF THE INVENTION

The present invention provides a vent system separate from the filler port or cap. A vent pipe having one end opening upwardly in the cavity of the fuel tank is surrounded by a baffle wall closed at its upper end and open downwardly. The baffle is positioned relative to the vent pipe to restrict the flow of fuel out the vent pipe when the fuel is agitated. The upper edge of the baffle wall may be connected to the top tank wall.

The vent pipe passes through an aperture in the outer tank wall and in a further embodiment is fitted with a barb for connecting a second end of the vent pipe to a tube. The combined length of the vent pipe and the attached tube encourages the evaporation of any small amount of liquid fuel entering the vent pipe prior to it exiting the drain tube. The aperture may be internally threaded and the vent pipe may have external threads for engaging and sealing with the aperture.

In yet another embodiment, the tank has a fill port in the top wall of the tank and there is a partition extending downwardly from the top wall between the baffle and fill port. The partition wall limits the height to which the tank may be filled and hence ensures that the vent pipe end and the baffle wall are generally above the surface of the liquid fuel.

The objects of the invention therefore include:

(a) reducing the amount of liquid fuel escaping through a vent;

(b) limiting the exposure of the operator to vented fuel and fuel vapor; and (c) providing a venting system that can readily, inexpensively and reliably be incorporated into a fuel tank.

Other objects and advantages besides those discussed above will be apparent to those skilled in the art from the description of a preferred embodiment of the invention which follows. In the description, reference is made to the accompanying drawings, which form a part hereof, and which illustrate one example of the invention. Such example, however, is not exhaustive of the various alternative forms of the invention, and therefore reference is made to the claims which follow the description for determining the full scope of the invention.

BRIEF DESCRIPTION OF THE DRAWINGS

FIG. 3 is an enlarged view of an alternative embodiment of a portion of FIG. 2 with some parts omitted for clarity; and FIG. 4 is an enlarged view of an alternative embodiment similar to that of FIG. 3.

Figure 1:
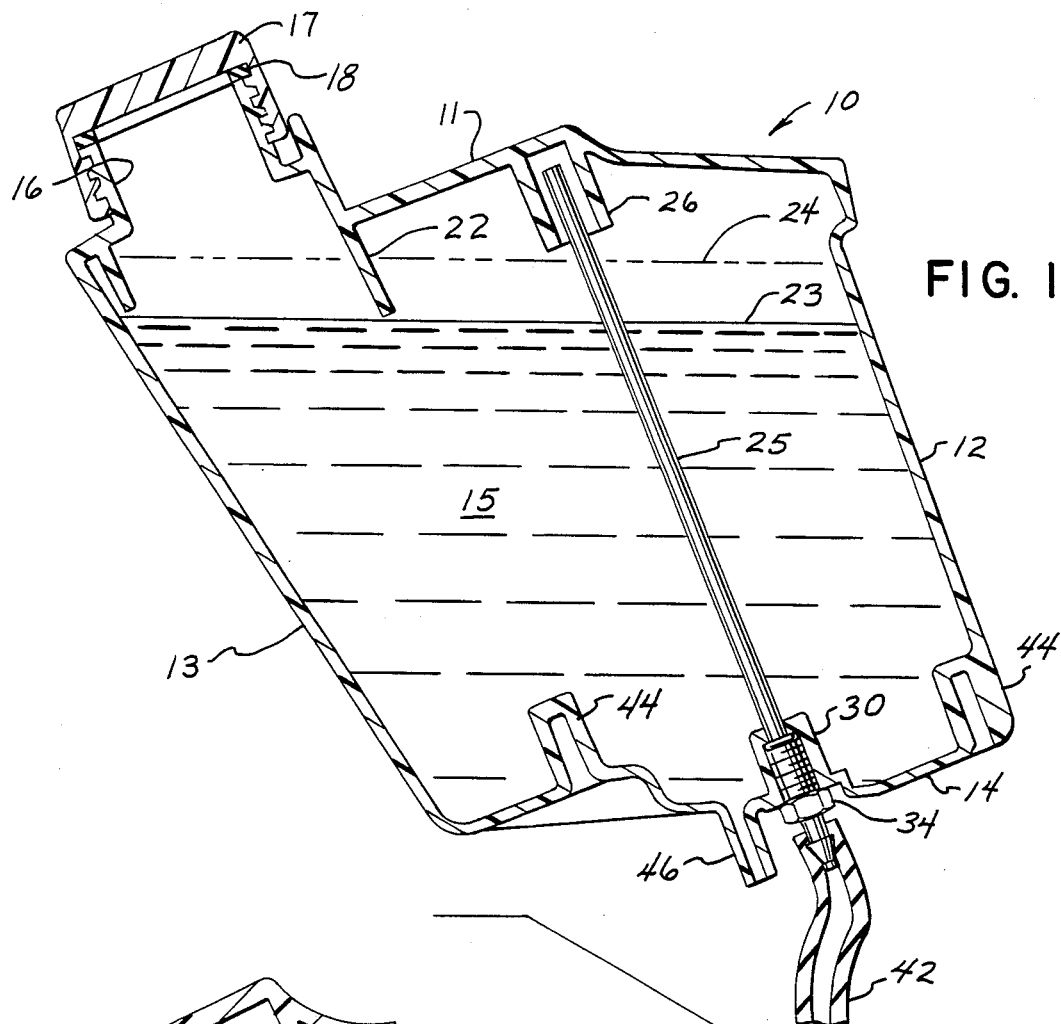
FIG. 1 is a cross-sectional view of a fuel tank incorporating the present invention.

DESCRIPTION OF THE PREFERRED EMBODIMENT,

Referring to FIG. 1, a fuel tank 10 has outer walls 11, 12, 13 and 14. The tank 10 may be filled with a quantity of fuel 15 through fill port 16 in the upper tank wall 11. The outer rim of the fill port 16 is threaded to receive a cap 17 to seal the fill port 16 by using gasket 18 captured between the upper rim of the fill port 16 and the lower edge of the cap 17 when the cap 17 is threaded fully onto the fill port 16.

A partition wall 22 extends downward into the tank 10 from the upper tank wall 11 and together with the tank side wall 13 surrounds the fill port 16. The partition wall 22 serves to limit the amount of fuel 15 added to the fuel tank 10. When the fuel level is below the lowest edge of the partition wall 22, air may flow around the lowest edge of the partition wall 22 to escape out of the fill port 16 from the upper portion of the tank 10. This permits the unobstructed inflow of additional fuel 15.

Once the fuel level has risen to level 23 at the lowest edge of the partition wall 22, air in the upper portion of the tank 10 outside of the partition wall 22 may no longer escape out of the fill port 16. The trapped air therefore resists fuel flow beyond the confines of the partition wall 22. This causes the fuel level to rise rapidly to the upper rim of the fill port 16 signalling that the tank 10 is full. After a time, trapped air in the portion of the tank 10 outside of the partition wall 22 will vent slowly out of a vent pipe 25 in a manner to be described. This permits fuel 15 to flow slowly into that area until it reaches an equilibrium level, designated as the maximum fuel level 24.

Vent pipe 25 has one end extending upwardly above the maximum fuel level 24 to the highest point in the tank 10 beneath upper tank wall 11 (and outside the partition wall 22). The upper end of the vent pipe is coaxially surrounded by a cylindrical baffle wall 26 extending downward from the upper tank wall 11 but stopping above the maximum fuel level 24. The upper edge of the baffle wall 26 is closed by the upper tank wall 11 so that fuel 15, fuel vapor, or air may enter only upward between the baffle wall 26 and the vent pipe 25 and must reverse direction to flow downwardly through the vent pipe. The internal diameter of the vent pipe, of approximately 0.060", and its length, of approximately 7",serves to control the rate of flow through the vent pipe 25 and selectively restricts liquids over gases on account of the former's higher viscosity. Generally, a smaller diameter of the vent pipe is better, provided that sufficient gas can escape through the vent system to permit suitable pressure adjustment of the tank 10. A range of vent pipe inner diameters from a minimum of 0.040" to a maximum of 0.060" is preferred.

Figure 2:
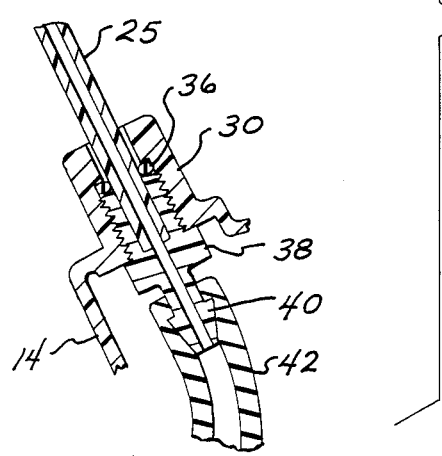
FIG. 2 is an enlarged view of two portions of FIG. 1.

Referring to FIG. 2, when the fuel tank 10 is agitated, the fuel surface 28 may rise up to the lower edge of the baffle wall 26 where the baffle wall 26 and the restricted flow of the vent tube 25 serve to trap a cushion of air that limits the amount of liquid fuel 12 that will find its way into the vent tube 25.

Referring to FIG. 3, in an alternate embodiment, the lower edge of the baffle wall 26 may extend downward below the maximum fuel level 24 so as to provide improved baffling. A slot 27 extending from the lower edge of the baffle wall 26 upwardly to the height of the maximum fuel level 24 is cut in the baffle wall to permit the free flow of vapor from above the maximum fuel level 24 into the vent tube 25 (not shown in FIG. 3). The purpose of this slot 27 is to prevent pressure from trapped vapor from forcing fuel 15 up into the chamber formed by the baffle wall 26 and over the top of the vent tube 25 when the height of the fuel 15 is near the maximum fuel level 24. In yet another embodiment, shown in FIG. 4, the slot 27 may be replaced by a hole 29 positioned slightly above the maximum fuel level 25 to similar effect.

The other end of the vent pipe 25 extends downwardly though the fuel 15 after which it passes through an aperture 30 in the lower tank wall 14. The lower end of the vent pipe 25 is bonded to a threaded fitting 34 having outer pipe threads which engage corresponding inner pipe threads cut in the aperture 30. The fitting 34 may be threaded into the aperture 30 thereby holding the vent pipe 25 and orienting it with respect to the lower tank wall 14 and the upper baffle wall 26. A hexagonal flange 38 on the lower end of the fitting 34 outside of the tank 10 provides a means for tightening the fitting 34 within the aperture 30 with a wrench. The sealing of the pipe threads is assisted by an O-ring 36 compressed between the upper end of the fitting 34 and an opposing surface of a shoulder on the upper lip of the aperture 30.

The fitting 34 and the vent pipe 25 are fabricated of nylon and attached together by means of spin bond welding. It will be apparent to those skilled in the art that other fuel resistant materials and fabrication methods may be used.

An axial passage through the fitting 34 joins the vent pipe 25 to a barbed end 40 for mating with an elastomeric drain tube 42. The tube 42 may be used to conduct the vented vapors and any fuel 15 to a desired location removed from the operator.

The tank 10 can be injection molded out high density polyethylene and may be attached to a bracket affixed to the engine platform (not shown) by means of mounting bosses 44 which accept self-tapping screws. It will be understood by those skilled in the art that other fuel resistant materials and other fabrication techniques may be used.

The lowermost portion of the tank 10 includes an integral fuel outlet 46 for conducting liquid fuel 12 to the engine (not shown).

The above description has been that of a preferred embodiment of the present invention. It will occur to those who practice the art that many modifications may be made without departing from the spirit and scope of the invention. For example, the vent pipe may be formed integrally with the fuel tank 10.

I claim:

1. A fuel tank having a vent system, the tank comprising:

outer top, bottom and side walls that define a fuel containing cavity;

a vent pipe having a first end opening upwardly in the cavity;

a baffle wall surrounding said first end of the vent pipe which is closed at its upper end and open downwardly;

an aperture in the outer tank wall, said vent pipe having a second end communicating with the aperture;

whereby the baffle is positioned relative to the first end of the vent pipe as to restrict the flow of fuel out the vent pipe when the fuel is agitated.

2. The tank of claim 1 whereby the vent pipe extends outside of the fuel tank and has a barb for connecting a tube to the second end.

3. The tank of claim 1, wherein the aperture is internally threaded and the vent pipe has external threads for engaging and sealing with the aperture.

4. The tank of claim 1, wherein the upper edge of the baffle wall is connected to the top tank wall.

5. The vent system of claim 1 wherein the tank has a fill port in the top wall of the tank and there is a partition extending downwardly from the top wall between the baffle and fill port for limiting the fuel height to a maximum level.

6. The tank of claim 1, wherein the lower edge of the baffle wall extends below the maximum fuel level and including a passage in the baffle wall for permitting the passage of vapor when fuel is at the maximum level.

* * * * *